US008307971B2

United States Patent
Spall et al.

(10) Patent No.: US 8,307,971 B2
(45) Date of Patent: *Nov. 13, 2012

(54) CHECK-PROCESSING DEVICE WITH CONDITIONALLY-REVERSIBLE TRACK DIRECTION

(75) Inventors: J. Michael Spall, Oakland, MI (US); Johan P. Bakker, Brighton, MI (US)

(73) Assignee: Burroughs Payment Systems, Inc., Plymouth, MI (US)

( * ) Notice: Subject to any disclaimer, the term of this patent is extended or adjusted under 35 U.S.C. 154(b) by 953 days.

This patent is subject to a terminal disclaimer.

(21) Appl. No.: 12/319,057

(22) Filed: Dec. 31, 2008

(65) Prior Publication Data

US 2010/0166288 A1      Jul. 1, 2010

(51) Int. Cl.
*G07F 7/04* (2006.01)

(52) U.S. Cl. .......... 194/206; 194/207; 271/65; 271/186; 271/291; 399/364; 235/475; 235/480

(58) Field of Classification Search .......... 194/206, 194/207; 235/439, 440, 375, 480; 209/534; 271/3.14, 65, 186, 291; 399/364

See application file for complete search history.

(56) References Cited

U.S. PATENT DOCUMENTS

| | | | |
|---|---|---|---|
| 4,456,237 A * | 6/1984 | Buddendeck | 271/3.05 |
| 4,714,214 A * | 12/1987 | Schleimann-Jensen et al. | 244/3.16 |
| 4,714,241 A * | 12/1987 | Randall | 271/3.03 |
| 6,081,687 A * | 6/2000 | Munemori et al. | 399/374 |
| 6,257,783 B1 * | 7/2001 | Hanaoka et al. | 400/578 |
| 6,640,521 B2 * | 11/2003 | Simkins et al. | 53/460 |

\* cited by examiner

*Primary Examiner* — Jeffrey Shapiro

(74) *Attorney, Agent, or Firm* — Honigman Miller Schwartz and Cohn LLP

(57) ABSTRACT

An apparatus includes a document track, a processing device, and a selector gate after the processing device. The document track includes a second, return path extending from a location at the selector gate to a location before the processing device. A bi-directional drive mechanism receives the document as the document passes through the selector gate in the forward direction. A gate actuator selectively moves the selector gate. Upon the bi-directional drive mechanism reversing direction after receiving the document to drive the document in the reverse direction, when the selector gate is in the first position, the selector gate diverts the document into the return path and re-introduces the document to the processing device with the document now in a reverse orientation. When the selector gate is in the second position, the selector gate allows the document traveling in the reverse direction to be re-introduced, in reverse, to the processing device.

20 Claims, 2 Drawing Sheets

CHECK-PROCESSING DEVICE WITH CONDITIONALLY-REVERSIBLE TRACK DIRECTION

BACKGROUND OF THE INVENTION

1. Field of the Invention

The invention relates to document processing, and to compact, desktop document processors for capturing images from checks and other financial and payment-related documents.

2. Background Art

Historically, banks processed large volumes of paper checks in centralized locations, either a central bank or a clearing house. Document processing machines in such locations were large, processing up to 2000 documents per minute. These machines were supported by dedicated, trained operators.

However, centralized processing costs banks typically three days in clearing a document. The "Check Clearing for the 21st Century Act" or the "Check 21 Act" was enacted by Congress to facilitate check truncation by authorizing substitute checks, to foster innovation in the check collection system without mandating receipt of checks in electronic form, and to improve the overall efficiency of the Nation's payments system. The Check 21 legislation has driven the demand for decentralized check imagers and sorters in financial institutions. Check 21 gives equal legal validity to electronic data obtained from documents, and has made it possible for banks to distribute document processing to speed the clearing process. Check 21 has made it advantageous for banks to convert paper checks to electronic data as early as possible.

In the recent past, banks have partially converted paper check information to electronic data. In some cases this partial information was used internally. In other cases two banks would agree on standards for electronic data transfer. In either case, the paper check was still the only legal document for the transaction. Check 21 has standardized these agreements across the banking industry, and given the electronic data legal merit, if the electronic data meet the requirements set forth in Check 21.

Accordingly, Check 21 has led to a rapid expansion of check-processing solutions based upon interchange of electronic images rather than paper checks, and with this there has been a flood of smaller, cheaper check-processing devices which all have the aim of capturing check images ever-more-early in the payment transaction. This process, known as truncation, aims to remove the physical paper check from the process of payment clearing as quickly as possible—ideally, at the point of presentment (cashier station, merchant counter, etc.). Because it is advantageous for banks to convert paper checks to Check 21 valid electronic data as early as possible, compact, desktop document processors have been developed. Some of these payment system devices are designed for use on a counter top, or at a teller window.

As check-processing machines directed at the check-imaging truncation market become ever-smaller and cheaper, the proportional cost of digital image-capture means relative to the whole cost of the machine becomes ever-greater. Current check-processing machines have two digital image-capture devices, one for capturing the front image and another for capturing the rear image.

Workers in the art will be familiar with the growing range of check-processing machines which are being offered in response to the growth of digital-image-based check-clearing systems. In a process known generically as truncation, these machines seek to move the conversion from paper check to digital image ever-closer to the point of presentment, and so the market is filled with devices which are tailored to point-of-presentment use—at a teller window, at the merchant counter, and at the checkout station. Such devices must be small (to save valuable retail space), and they must be cheap to buy and own (to make their purchase and use attractive and to encourage the spread of truncation as widely as possible). However, compared to the check-processing machines of even the recent past, their processing speed need not be very fast—a transaction rate of 2 or 3 checks per minute may be perfectly-adequate in the truncation environment, where in the past machines have been required to operate as much as 1000 times faster than this.

The primary function of such machines is to capture a digital image of both sides of the check. To achieve this function, such machines conventionally drive the check by a system of, for example, belts and rollers in between two digital imaging devices or cameras, one capturing an image of the front face of the check and the other capturing an image of the rear face of the check as it passes by. Such cameras typically operate as linear scanning devices, the complete image being formed form a series of linear scans performed as the check moves past the camera.

There have been various technological generations of such image cameras, and the most-commonly used current embodiment is the contact image scanner, a linear device which uses rod-lens technology to capture images of passing documents which are held against the face of an integral glass screen.

CIS cameras, while efficient and of moderate cost when compared with previous generations of this technology, still form a significant part of the product cost of the latest generation of check-processing devices. This cost proportion is due, not only to the cost of the devices themselves, but also to the cost of the supporting electronics and associated power supply that each camera requires.

For the foregoing reasons, there is a need for a small, low-cost check-processing machine which has the capacity to capture digital images of both faces of a check.

SUMMARY OF THE INVENTION

In one embodiment of the invention, an apparatus for capturing images from checks and other financial and payment-related documents is provided. The apparatus comprise a compact, desktop document processor base unit including an input slot for receiving a document to be processed. A transport stage located within the base unit receives the document from the input slot. The transport stage includes a document track, a processing device located along the document track, and a selector gate located along the document track after the processing device. The document track includes a second, return path extending from a location at the selector gate to a location before the processing device. A bi-directional drive mechanism receives the document as the document passes through the selector gate in the forward direction. A gate actuator selectively is moves the selector gate between a first position and a second position.

Upon the bi-directional drive mechanism reversing direction after receiving the document to drive the document in the reverse direction, when the selector gate is in the first position, the selector gate diverts the document traveling in the reverse direction into the second, return path and re-introduces the document to the processing device with the document now in a reverse orientation. When the selector gate is in the second position, the selector gate allows the document traveling in the reverse direction to be re-introduced, in reverse, to the processing device.

Embodiments of the invention may include various additional features. For example, the transport stage may include a pair of drive rollers and associated idler rollers which cooperate to form the document track. Further, one of the drive rollers may form the bi-directional drive mechanism.

The processing device may be, for example, an image camera or a printing mechanism.

The gate actuator may be implemented in various ways. In one approach, the gate actuator further comprises a programmable powered actuator connected to the selector gate for pivotally driving the selector gate between the first position and the second position. In another approach, the gate actuator further comprises an eccentric cam acting upon the selector gate for pivotally driving the selector gate between the first position and the second position. A second bi-directional drive mechanism formed by one of the drive rollers may be used to drive the eccentric cam.

Further, it is appreciated that embodiments of the invention are suitable for compact, desktop document processing applications. However, embodiments of the invention may also be implemented with feeder and transport stages that are not limited to the compact, desktop document processor base unit.

DETAILED DESCRIPTION OF THE PREFERRED EMBODIMENTS

Figure 1:
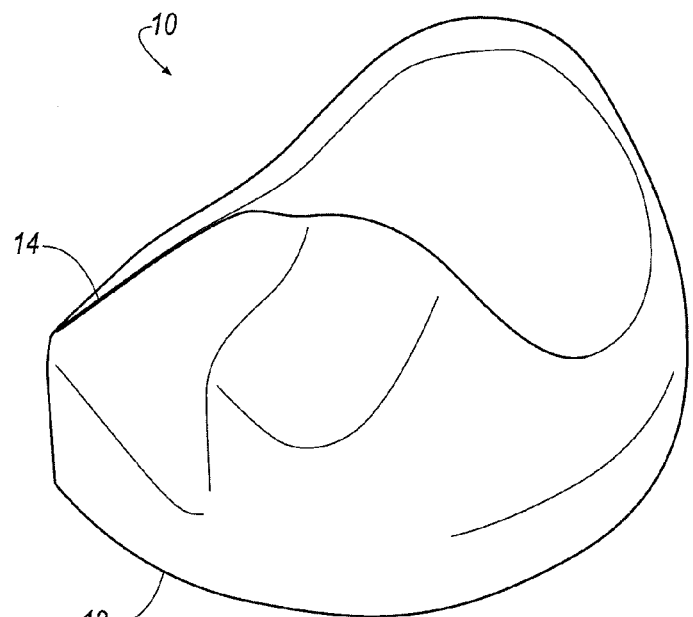
FIG. 1 illustrates a compact, desktop document processor in an embodiment of the invention.

As shown in FIG. 1, a compact, desktop document processor is generally indicated at 10. The apparatus 10 includes base unit 12, and input slot 14 for receiving a check or other document to be processed. In general, apparatus 10 is used for decentralized document processing applications. The input slot 14 provides the operator with an area to place a document to be processed, and assists with document alignment.

The apparatus 10 may be constructed to perform any number of known document processing actions as appreciated by one of ordinary skill in the art. Suitable electronics and mechanical mechanisms are located within base unit 12. For example, apparatus 10 may perform front and rear image capture. Other mechanisms could also be located in base unit 12, depending on the application. Advantageously, the electronics and mechanical mechanisms required for the document processing actions are provided within base unit 12 as readily understood by one of ordinary skill in the art. The apparatus 10 may be provided with a suitable network connection interface such as Universal Serial Bus (USB). It is appreciated that apparatus 10 is suitable for processing checks as well as other financial and payment-related documents.

The apparatus 10 is an example of a document processor for which embodiments of the invention may be used. Embodiments of the invention may also be implemented in other devices.

Figure 2:
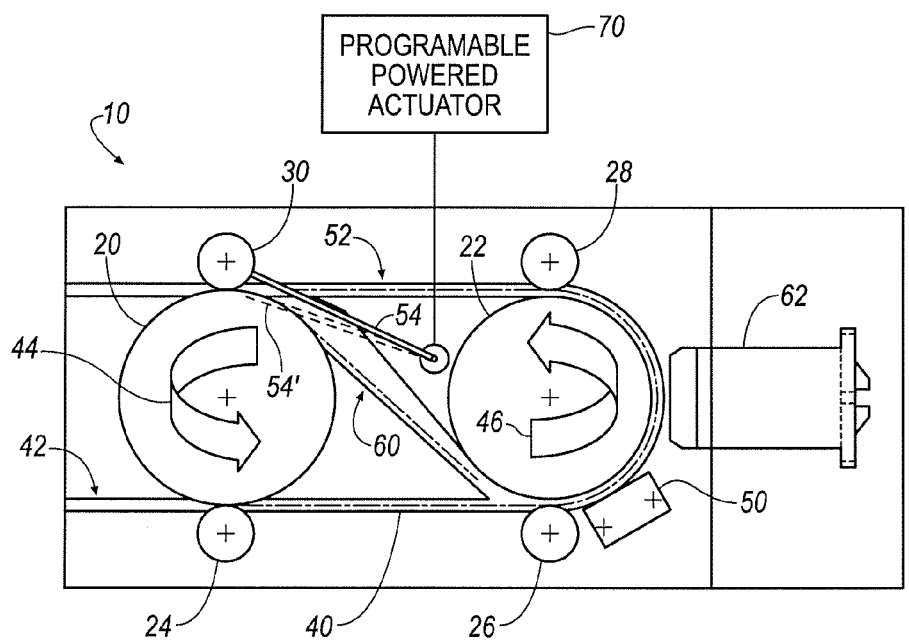
FIG. 2 illustrates a schematic view of a document processor, showing the single image camera and conditionally-reversible track direction in a first embodiment.

With reference to FIG. 2, the illustrated embodiment includes a pair of cylindrical drive rollers 20, 22 and associated spring-loaded idlers 24, 26, 28, 30 which together form a document guide track 40 of approximately-oval form. Workers will understand that the basic track form may be supplemented by conventional document guide walls and the like, which are not specifically shown.

The cylindrical drive rollers 20, 22 are each individually driven by a suitable electric motor, and at least one of them (the left-hand roller 20 in the particular embodiment shown) is capable of being bi-directionally driven.

When a document to be processed is inserted into the machine in the entrance track portion 42 shown, both drive rollers 20, 22 are rotating in a counter-clockwise direction as indicated by arrows 44, 46, and the document is thus driven along the track, past an image camera 50 which captures an image of one face of the document, and around the periphery of the right-hand roller 22.

As the leading edge of the document passes through the track section 52 between the two rollers 20, 22, it passes through a selector gate 54. The selector gate may be moved between a first position shown in solid line at 54 and a second position shown in dashed line at 54'; the selector gate is controlled by a programmable powered actuator 70. In one possible implementation, the selector gate may be biased, for example, by a spring, to first position 54. As the document passes through the track section 52 between the two rollers 20, 22, the document itself urges the selector gate toward the second position 54', allowing the document to pass. In an alternative, the selector gate may be entirely controlled by the actuator 70.

In either case, when the trailing edge of the document passes through the gate, the left-hand drive roller 20 reverses its direction and the document commences to move in the opposite direction. The trailing edge becomes the leading edge, and it encounters the selector gate 54 in the other direction. If the selector gate is in the first position 54 (for example, due to a biasing spring or actuator 70 depending on the implementation), the selector gate in position 54 then directs the document into a second path 60 between the two rollers 20, 22, which re-introduces the document into the right-hand drive roller 22 in a reversed orientation. As the document proceeds around the right-hand drive roller 22, the opposite face is presented to the image camera 50, which then captures a digital image of it. The distance from the selector gate, through the second path 60 and around the right-hand drive roller 22 is so arranged as to be longer than the longest document that will be fed into the machine 10, thus ensuring that the leading and trailing edges of a document will never coincide. When the trailing edge of the document leaves the left-hand drive roller 20, that roller 20 immediately reverses its direction of rotation so as to be ready to accept and drive the leading edge of the same document as it again appears at the selector gate. In this manner, a single image camera 50 can be used to capture images of both faces of a single document.

As described above, the orientation of the document may be reversed each time the document makes a single pass through the track. However, there may be processing requirements and sequences when it would be preferable to pass the document several times without reversing the document. In accordance with the invention, the reversing function may be selected or de-selected as the user desires, and allowing any sequence of document passes, with or without reversal, to be performed.

With continuing reference to FIG. 2, the programmable powered actuator 70 can alter the position of the selector gate to position 54' such that when the trailing edge of the document has passed through the gate and the left-hand drive roller 20 reverses its direction and the document commences to move in the opposite direction, this results in the document returning through the upper track section 52.

As the document returns through the upper track section 52, the trailing edge becomes the leading edge, and the document faces are not reversed relative to the functional devices in the track. Since all of the functions that are contemplated for the track design (for example, MICR reading, CIS imaging, and ink-jet printing) are equally apt to be employed in either direction of travel, it makes no difference to their function in which relative direction the document travels past them. The use of the powered, programmable actuator 70 in this illustrated embodiment allows the user to select whether or not a document shall be reversed, or not, for each single pass that it makes, which may be referred to as conditional-reversal.

Figure 3:
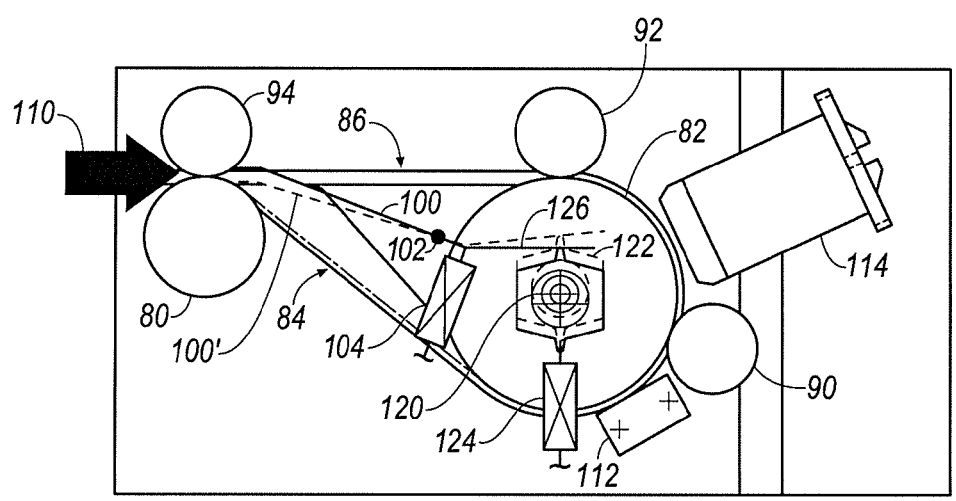
FIG. 3 illustrates a schematic view of a document processor, showing the single image camera and conditionally-reversible track direction in a second embodiment.

FIG. 3 illustrates a second embodiment of the invention, which achieves conditional-reversal without the use of an additional actuator, but rather by a mechanism which provides the selector gate function using one of the existing track drive motors.

With reference to FIG. 3, an apparatus includes a track having two drive rollers 80, 82, each of which is driven by its own, separate, reversible-drive motor. The peripheries of the two drive rollers 80, 82 are joined by two straight track sections, the reversing track 84 and the non-reversing track 86. Disposed opposite the drive rollers 80, 82 are various pressure rollers 90, 92, 94, which provide normal force and drive to the document.

A pivoting track gate 100 is shown, which rotates on pivot 102 and is biased in one direction by a spring 104. The gate 100 is shown in its normal condition as a solid line and in its spring-deflected position as a dashed line 100'.

A document is fed into the machine along entry/exit track 110, at which time drive roller 80 is rotating in a clockwise sense and drive roller 82 is rotating in a counterclockwise sense. The document passes between drive roller 80 and pinch roller 94 and is directed along reversing track 84 by gate 100 in its normal condition. As soon as the trailing edge of the document passes roller pair 80/94, roller 80 reverses its direction of rotation. The document, meanwhile, travels around roller 82, past image camera 112 and inkjet printhead 114, and so into non-reversing track 86. The leading edge then encounters gate 100 and pushes it aside into its spring-deflected position, and the leading edge then passes back into the grip of roller pair 80/94. This continues until the trailing edge of the document passes gate 100, at which point, gate 100 returns to its normal condition under the action of spring 104 and the drive motor of roller 80 reverses direction. It will be seen that the document will reverse and commence to travel along reversing track 84 in the same way as before—but with the faces reversed. This is referred to as repeating reversal.

However, if it is desired not to reverse the document, an intermediate step is added. Located on the drive shaft of the motor of roller 82 is a conventional one way clutch, as will be understood by workers in the art. This clutch spins freely when the shaft is rotating in the counter-clockwise sense. However, when the shaft spins in the clockwise sense, the clutch locks and commences to drive an eccentric cam-clutch and cam are indicated at 120. This cam in turn drives a linear slider 122, which is provided with an extension spring 124. Linear slider 122 is so constructed and disposed as to have a portion which can act upon an extension 126 of the gate 100.

Returning now to the document which has made one pass around the track and is stopped with its trailing edge in roller pair 80/94, and it is now desired to pass the document through the track again but without reversing the faces—with the document still stopped in roller pair 80/94, the motor of drive roller 82 is started in the clockwise sense. Clutch 120 locks and drives the cam in a clockwise sense, engaging linear slider 122 and driving it upwards. The upper end of slider 122 engages the extension 126 of gate 100, driving it from its normal condition 100 (solid line) to its spring deflected condition 100' (dashed line). The motor of drive roller 82 stops driving when it has completed 180° of rotation, the cam 120 and slider 122 are at their maximum deflection, and the gate is in its spring-deflected condition 100'. In this state, cam 120 and slider 122 are in their top-dead-center condition relative to spring 124, and so the clutch will stay locked to the motor shaft since there is no differential rotation to unlock it.

If drive roller 80 now commences to rotate in a clockwise direction, it will be seen that the leading edge of the document will travel straight and reverse into track section 86 rather than into track section 84. Once the leading edge of the document is past the gate 100', drive roller 82 commences to rotate in a clockwise sense also, driving the document around the track in the reverse direction but with the document faces in the same direction as the prior pass. Once the trailing edge of the document is clear of roller pair 80/94, roller 80 immediately reverses direction and commences to drive in a counter-clockwise direction.

Workers will understand that, as the document proceeds along the track in this direction, the clockwise rotation of roller 82 will cause clutch 120 to remain engaged, and so slider 122 will continue to cycle in and out and gate 100 will repeatedly cycle back and forth against the passing document until the trailing edge is past the gate. However, this is not an issue once the leading edge of the document is past the gate and the gate will merely lay against the surface of the passing document.

Once the document has traveled to the point where its trailing edge is clear of roller 82, roller 82 reverses direction and commences to drive in a counter-clockwise direction. Clutch/can 120 unlocks from the motor shaft and cam and slider 122 return to their retracted position under the influence of spring 124. Gate 100 returns to its normal condition. The document continues to drive outwards into track 110 until the trailing edge is located at roller pair 80/94, at which point, roller 80 stops until it is decided whether the next document pass (if any) will be reversed or not-reversed.

Workers will understand that the principle of conditionally-reversing the document has many applications. For example, there are other processes in addition to imaging, such as printed endorsements, which are sometimes required to be performed upon checks being processed, and which may be required to be performed on both faces. Furthermore, in some embodiments, it may be desirable for these endorsements to be captured as part of the digital images of the check. Conventionally, such endorse means would be provided by two printing mechanisms, one for each side of the check. By a similar application of the invention, endorsement capability can be provided on both faces of the check using only one printing mechanism 62 (FIG. 2), 114 (FIG. 3).

In such a case, the single printing mechanism could be provided, and workers will understand that by repeatedly cycling a document through the machine as described above, with each cycle causing the document to reverse its orientation in the track, it is possible to endorse and/or image both faces of a document using only a single endorse device and a single image-capture device, and that it is possible to perform these tasks in any desired sequence by selecting which process is applied during which cycle.

Workers will further understand that the track layouts shown are merely exemplary and that many variations of entry, exit and transport location/direction are possible without altering the principle of operation. Further, it is appreciated that document tracking within the apparatus, when appropriate, may be achieved in any suitable way. For example, the document may be tracked by detecting the document with the image camera. In another example, conventional sensors or switches may be located along the document track for detecting the passing document.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An apparatus for capturing images from checks and other financial and payment-related documents, the apparatus comprising:
    a compact, desktop document processor base unit including an input slot for receiving a document to be processed;
    a transport stage located within the base unit and receiving the document from the input slot, the transport stage including a document track, a processing device located along the document track, and a selector gate located along the document track after the processing device;
    the document track including a second, return path extending from a location at the selector gate to a location before the processing device;
    a bi-directional drive mechanism for receiving the document as the document passes through the selector gate in the forward direction; and
    a gate actuator for selectively moving the selector gate between a first position and a second position, wherein upon the bi-directional drive mechanism reversing direction after receiving the document to drive the document in the reverse direction, when the selector gate is in the first position, the selector gate diverts the document traveling in the reverse direction into the second, return path and re-introduces the document to the processing device with the document now in a reverse orientation, and when the selector gate is in the second position, the selector gate allows the document traveling in the reverse direction to be re-introduced, in reverse, to the processing device.

2. The apparatus of claim 1 wherein the transport stage further comprises:
    a pair of drive rollers and associated idler rollers which cooperate to form the document track.

3. The apparatus of claim 2 wherein one of the drive rollers forms the bi-directional drive mechanism.

4. The apparatus of claim 1 wherein the processing device is an image camera.

5. The apparatus of claim 4 wherein the transport stage further comprises:
    a pair of drive rollers and associated idler rollers which cooperate to form the document track, wherein one of the drive rollers forms the bi-directional drive mechanism.

6. The apparatus of claim 1 wherein the processing device is a printing mechanism.

7. The apparatus of claim 6 wherein the transport stage further comprises:
    a pair of drive rollers and associated idler rollers which cooperate to form the document track, wherein one of the drive rollers forms the bi-directional drive mechanism.

8. The apparatus of claim 1 wherein the processing device is an image camera; and
    wherein the transport stage further comprises a printing mechanism.

9. The apparatus of claim 8 wherein the transport stage further comprises:
    a pair of drive rollers and associated idler rollers which cooperate to form the document track, wherein one of the drive rollers forms the bi-directional drive mechanism.

10. The apparatus of claim 1 wherein the gate actuator further comprises:
    a programmable powered actuator connected to the selector gate for pivotally driving the selector gate between the first position and the second position.

11. The apparatus of claim 1 wherein the gate actuator further comprises:
    an eccentric cam acting upon the selector gate for pivotally driving the selector gate between the first position and the second position.

12. The apparatus of claim 11 further comprising:
    a second bi-directional drive mechanism formed by one of the drive rollers, the second bi-directional drive mechanism driving the eccentric cam.

13. The apparatus of claim 12 further comprising:
    a one-way clutch arrangement connecting the second bi-directional drive mechanism to the eccentric cam.

14. The apparatus of claim 13 further comprising:
    a linear slider mechanism drivingly connecting the eccentric cam to the selector gate.

15. The apparatus of claim 14 further comprising:
    an spring biasing the selector gate toward the first position such that the eccentric cam drives the selector gate to the second position, against the bias of the spring.

16. An apparatus for capturing images from checks and other financial and payment-related documents, the apparatus comprising:
    a feeder stage for receiving a document to be processed;
    a transport stage receiving the document from the feeder stage, the transport stage including a document track, a processing device located along the document track, and a selector gate located along the document track after the processing device;
    the document track including a second, return path extending from a location at the selector gate to a location before the processing device; and
    a bi-directional drive mechanism for receiving the document as the document passes through the selector gate in the forward direction; and
    a gate actuator for selectively moving the selector gate between a first position and a second position, wherein upon the bi-directional drive mechanism reversing direction after receiving the document to drive the document in the reverse direction, when the selector gate is in the first position, the selector gate diverts the document traveling in the reverse direction into the second, return path and re-introduces the document to the processing device with the document now in a reverse orientation, and when the selector gate is in the second position, the selector gate allows the document traveling in the reverse direction to be re-introduced, in reverse, to the processing device.

17. The apparatus of claim 16 wherein the transport stage further comprises:

a pair of drive rollers and associated idler rollers which cooperate to form the document track.

18. The apparatus of claim 17 wherein one of the drive rollers forms the bi-directional drive mechanism.

19. The apparatus of claim 16 wherein the gate actuator further comprises:

a programmable powered actuator connected to the selector gate for pivotally driving the selector gate between the first position and the second position.

20. The apparatus of claim 16 wherein the gate actuator further comprises:

an eccentric cam acting upon the selector gate for pivotally driving the selector gate between the first position and the second position.

* * * * *